Feb. 25, 1958 A. F. RHODES 2,824,757
PIPE SUSPENSION AND SEALING MEANS WITH MEANS
TO LIMIT COMPRESSION OF THE SEAL
Filed April 4, 1955 5 Sheets-Sheet 1
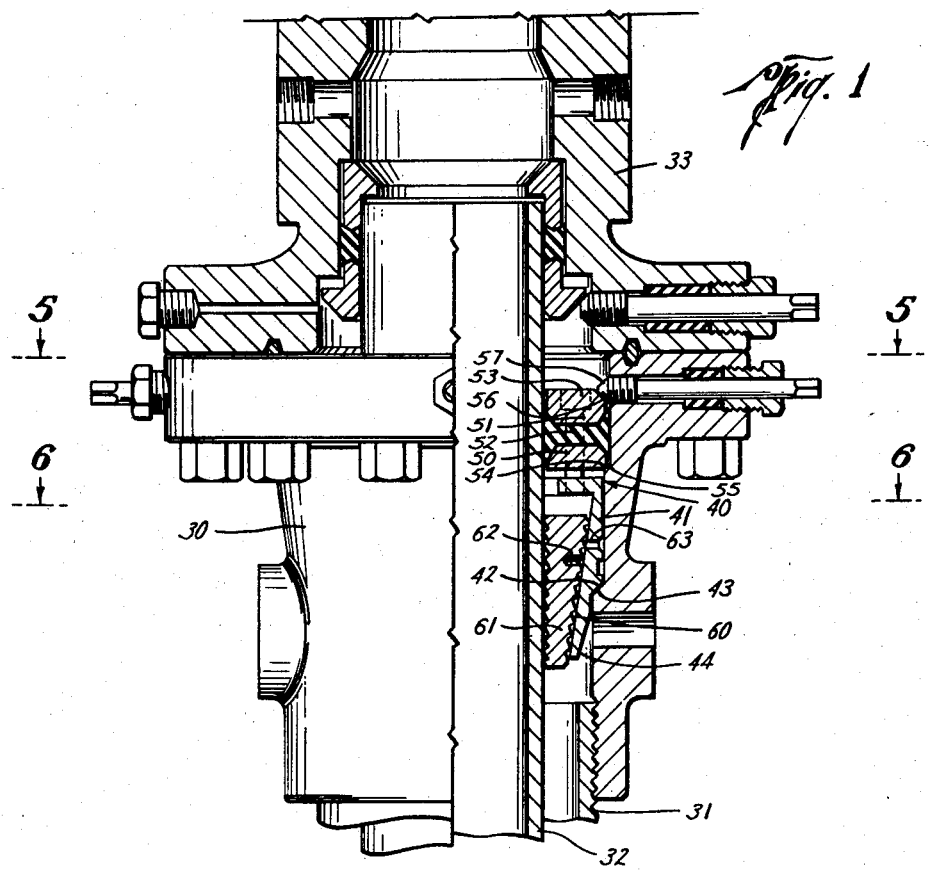
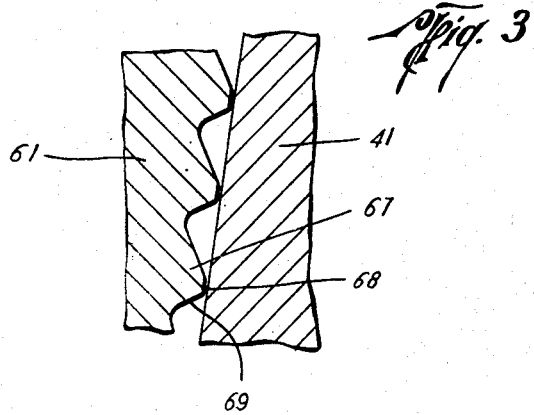
Allen F. Rhodes
INVENTOR.
BY Murray Robinson
ATTORNEY

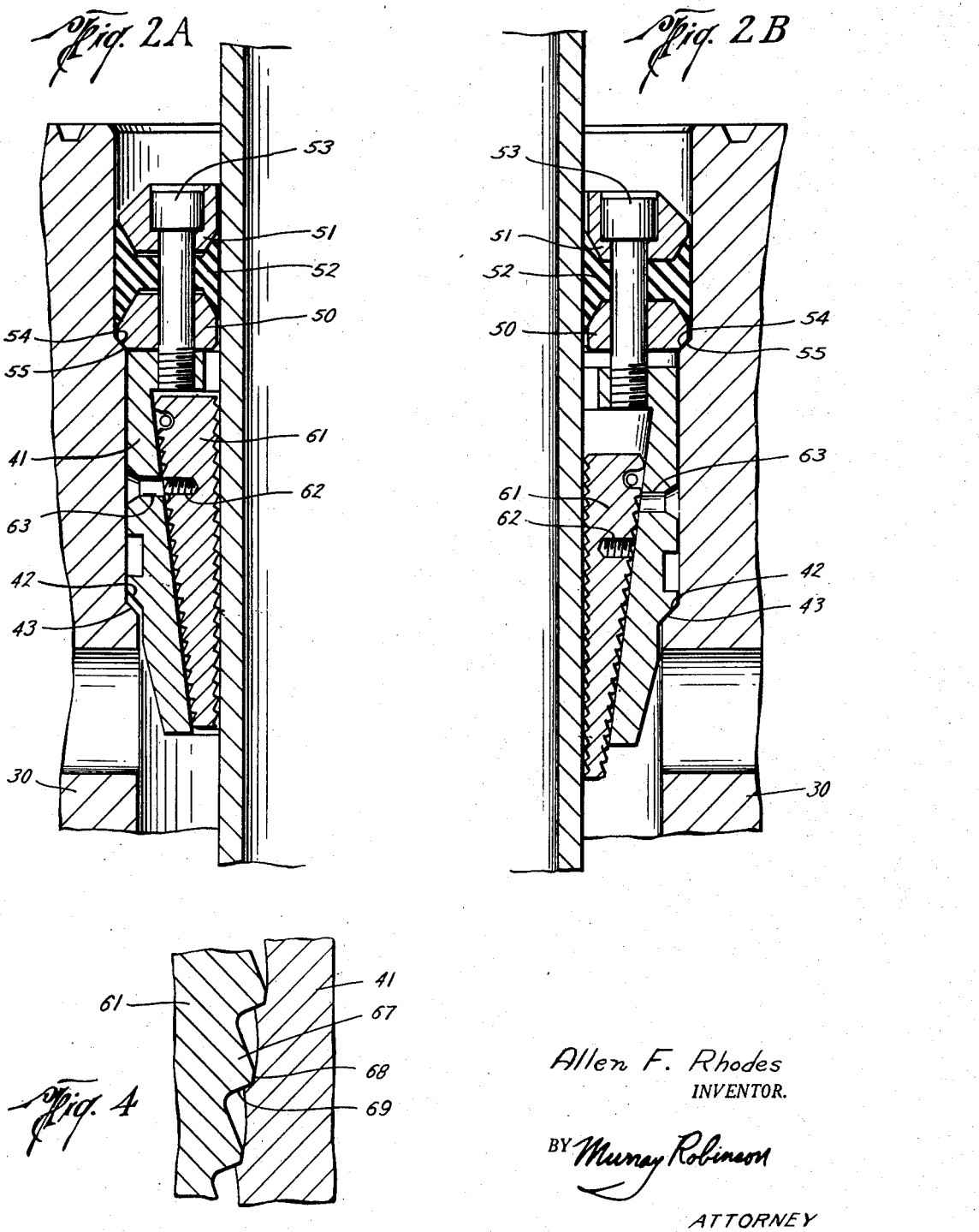

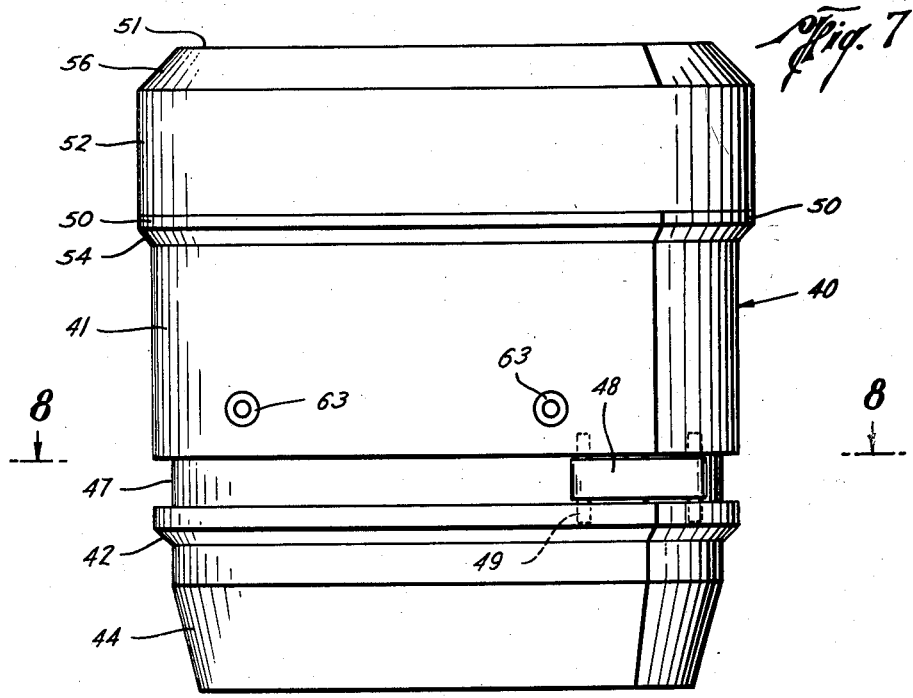
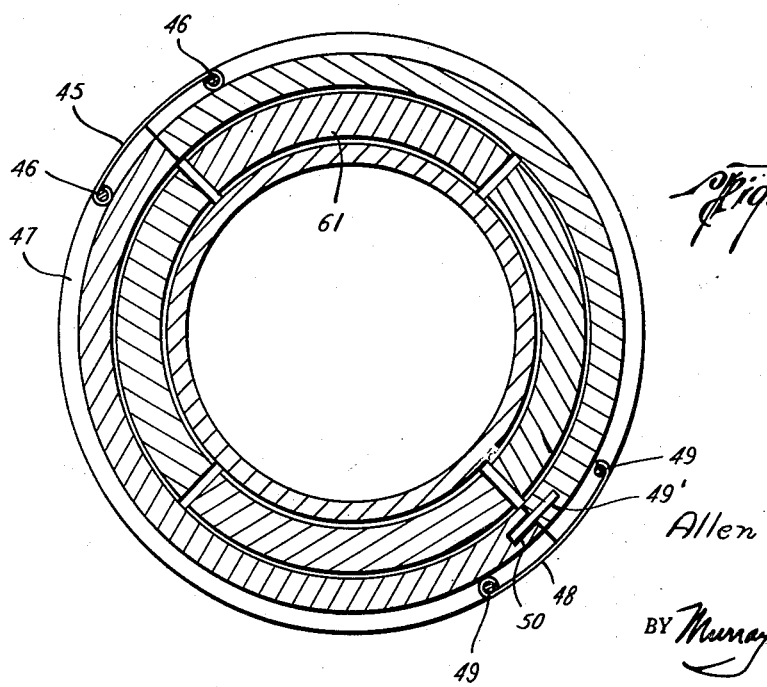
Allen F. Rhodes
INVENTOR.
BY Murray Robinson
ATTORNEY

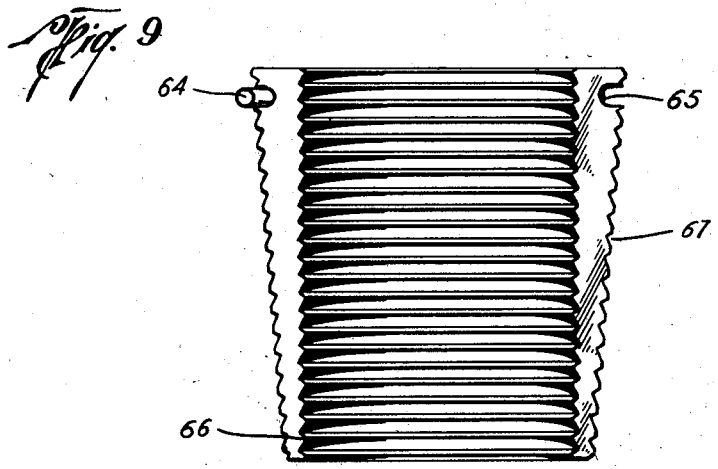
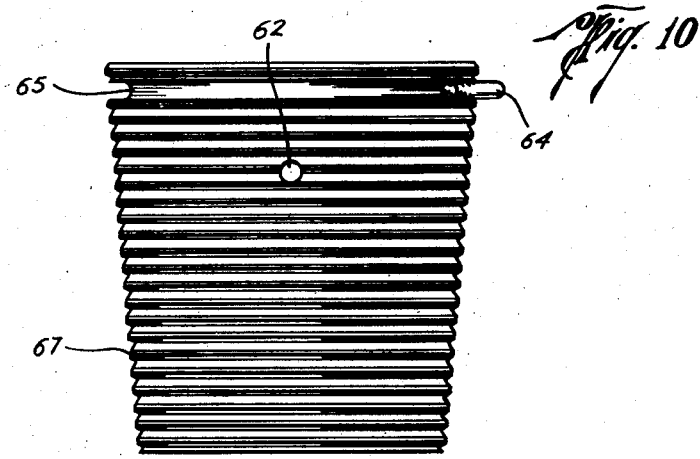

2,824,757
PIPE SUSPENSION AND SEALING MEANS WITH MEANS TO LIMIT COMPRESSION OF THE SEAL

Allen F. Rhodes, Houston, Tex., assignor to George A. Butler, Houston, Tex.

Application April 4, 1955, Serial No. 498,812

4 Claims. (Cl. 285—146)

This invention pertains to a pipe suspending and seal apparatus, especially for suspending and sealing a casing in a well head.

The object of the invention is to provide a suspension and sealing apparatus, comprising a well head and hanger, in which the hanger will automatically seal with the well head in which the hanger is seated when pipe weight is applied to the hanger, yet will limit the amount of pipe weight that is supported by the sealing means.

Another object of the invention is to provide such an apparatus in which the sealing means can be tightened from outside the well head.

A further object of the invention is to provide such an apparatus which will be entirely safe and reliable.

Other objects and advantages of the invention will appear from the following description of a preferred embodiment thereof in which:

Figure 1 is an elevation, partly in section, of a well head incorporating a casing suspension embodying the invention.

Figures 2A and 2B are enlarged sectional views showing portions of the casing suspension illustrated in Figure 1, and illustrating the slips thereof in unset and set positions respectively;

Figures 3 and 4 are sectional views on a still larger scale showing portions of the casing suspension in unset and set positions respectively;

Figure 5:
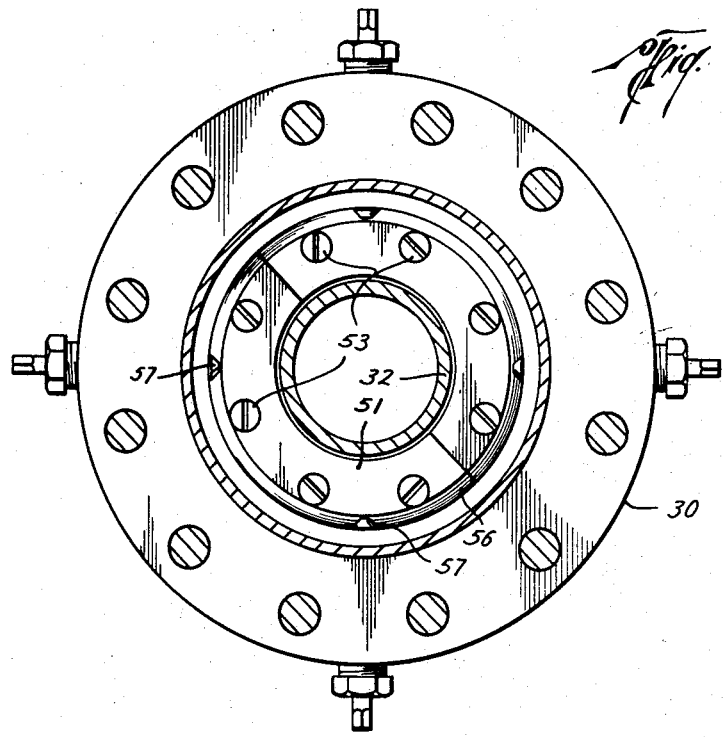
Figure 6:
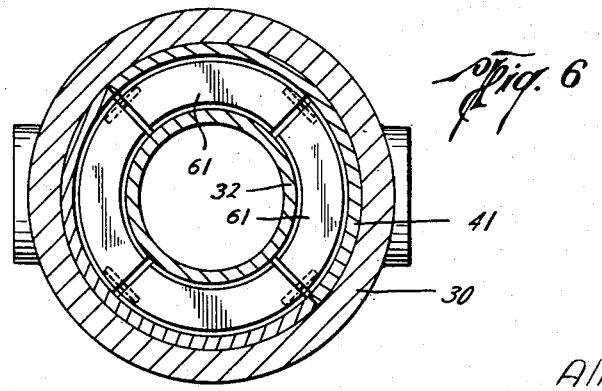

Figures 5 and 6 are horizontal sections taken along lines 5—5 and 6—6 of Figure 1;

Figure 7 is an elevation showing a casing hanger of the type illustrated in Figure 1;

Figure 8 is a top view of the casing hanger shown in Figure 7 and showing a set of slips disposed therein;

Figures 9 and 10 are front and back views of one slip of a set of slips embodying the invention, of the type shown in Figure 1.

Referring first to Figure 1 there is shown a casing head 30 secured to the upper end of a string of casing 31. Supported by and sealed to the casing head is the upper end of another string of casing 32 disposed inside the casing head and extending thereabove into the lower portion of tubing head 33. Casing 32 is also sealed to the tubing head.

Referring now also to Figure 7, the means for sealing between the casing head 30 and casing 32 includes a casing hanger 40 which comprises a hollow bowl 41 of generally circular cross section having upper and lower outer cylindrical portions separated by a conical shoulder 42 adapted to seat on a similar conical shoulder 43 inside the casing head. The lower end of the bowl 41 is conical on its exterior as shown at 44 to guide the bowl into place when it is lowered into the head.

As best shown in Figure 8, the bowl is preferably made in two halves which are pivotally connected together at one side by a spring steel double pintle hinge 45 whose pintles 46 are welded into recesses cut into the bowl above and below a channel 47, the channel being an easily machined space for the pintles and hinged to work in. At the opposite side from hinge 46 a spring steel latch 48 is pivotally and snap connected respectively to pins 49 mounted similarly to pins 46. A dowel pin 49' disposed in one half of the bowl adjacent latch 48 is adapted to enter a hole 50' in the other half of the bowl to help maintain alignment of the two halves of the bowl.

Referring again to Figures 1 and 7, and also to Figure 5, to the upper end of the bowl 41 is secured a means for sealing between the casing and casing head comprising a support ring 50, a compression ring 51 and a ring 52 of rubber-like sealing material such as neoprene disposed therebetween. The three rings of the sealing means are held together and to each other by means of a plurality of screws 53 screwed through the rings into the top of bowl 41. The rings are free to slide up and down on the screws 53. The support ring 50 has a bevel surface 54 around its lower outer periphery adapted to seat on a conical shoulder 55 inside the casing head 30. The compression ring 51 also has a bevel surface 56 around its upper outer periphery on which bear lock screws 57.

As shown in Figures 5 and 7, rings 50 and 51 are each preferably made in two halves, and ring 52 is split adjacent one of the junctures of the two halves of rings 50 and 51. The part of ring 52 adjacent the other juncture of the two halves of rings 50 and 51 serves as a hinge. Since ring 52 is fairly stiff and tends to retain its circular shape no latch is needed for the part of the sealing means that opens up to receive the casing.

Referring now to Figures 1, 9, and 10, the interior of bowl 41 is provided with a recess having a conical surface 60 within which are disposed a plurality of slips 61. Each slip is provided with a tapped recess 62 which can be aligned with one of a plurality of holes 63 through the bowl 41, whereby a screw, not shown, can be passed through hole 63 into hole 62 to retain the slip in the bowl and hold it in elevated, i. e., retracted position as shown in Figure 2A. These screws are removed after the hanger is placed around the casing and before it is lowered into the casing head. The slips are maintained in vertical alignment by the engagement of a pin 64 welded to one side of each slip with a groove 65 in the adjacent slip.

The inner or front face of each slip is provided with a plurality of teeth 66 which are preferably upwardly pointing and of modified buttress thread cross-section. In fact each set of slips is conveniently formed from an integral sleeve which is turned with an internal buttress thread before it is cut into four segments to form the slips.

On the outside or back face of each slip there are formed a plurality of teeth 67. These are preferably downwardly pointing and also of modified buttress thread cross section and having flat crests 68 as best shown in Figure 3. These teeth are also conveniently formed by cutting a helical thread on the exterior of a sleeve that is later cut into segments to form a set of slips. Although the teeth 67 are downwardly directed, they are what may be termed unloading teeth, in that the angles between the teeth flanks 69 on the lower sides of the teeth and the base material are obtuse angles. The combined area of the crests of teeth 67 is greater than the combined area of the crests of teeth 66.

Referring again to Figure 2A, in the unstressed condition the top of bowl 41 is in contact with support ring 50 and the distance between beveled surface 54 and shoulder 42 is less than the distance between shoulders 55 and 43. When the hanger is placed in the casing head it seats first on shoulder 55. Then, when the casing is lowered and the slips are pulled down in the bowl as shown in Figure 2B, the bowl seats on shoulder 43 and the screws 53 draw the compression ring 51 down to expand the seal ring radially against the casing head and the casing to seal therebetween.

Referring now to Figures 3 and 4, there is illustrated the action of the back teeth 67 on the backs of the slips 61. As shown in Figure 3, initially the flat crests 68 of the teeth slide down in the bowl 41 as load is applied by the front teeth of the slips gripping the casing. Then as the load increases, the stress at the area of contact between the crests 68 and the bowl 41 exceeds the yield point of the material of the bowl and the teeth 67 dig in as shown in Figure 4. The engagement of teeth 67 with the bowl 41 limits further downward movement of the slips and thereby prevents excessive radial inward motion of the slips so that the casing will not be collapsed.

It is to be noted that slips are usually heat treated so as to make them hard and strong. This is to enable the front teeth 66 to bite into the casing. It is therefore no extra trouble to provide hardened back teeth 67 which are heat treated at the same time as the rest of the slip. Since teeth 67 are harder and stronger than the slip bowl, the yield point of the slip bowl is lower than that of the slip teeth and on increasing load the bowl will yield while the teeth are still below their yield point and the teeth bite into the bowl.

When the casing has been suspended in the casing head by means of hanger 40, only part of the casing weight transferred to the hanger by slips 61 is carried by the screws 53, the major part of the weight being carried by shoulder or seat 43. This tends to prevent the sealing material from being placed under too heavy compression which might extrude it out too far and cause a leak. If for any reason it is found that the portion of the pipe weight transmitted through screws 53 to sealing material ring 52 is insufficient to form a good seal, or if the seal once formed should later start to leak, additional pressure can be placed on the sealing material by means of lock screws 57.

The limitation of the loading of screws 53 also tends to eliminate any failure of the apparatus through breaking of the screws 53. However, if the screws 53 should fail the apparatus will still function, all of the weight being taken on shoulder 43 of the casing head and lock screws 57 being available for compressing the sealing material ring.

While a preferred embodiment of the invention has been shown and described, many modifications thereof can be made by one skilled in the art without departing from the spirit of the invention and it is desired to cover by Letters Patent all forms of the invention falling within the scope of the following claims.

I claim:

1. Pipe suspension and seal apparatus comprising a well head having spaced upper and lower seats, and a pipe hanger having upper and lower parts, said upper part having a shoulder adapted to engage said upper seat and said lower part having a shoulder adapted to engage said lower seat, the axial distance between said upper and lower seats being greater than the axial distance between said shoulders when there is no pipe in said hanger whereby when said hanger is initially placed in said head without pipe load only the upper of said shoulders engages the corresponding seat, means connecting said upper and lower parts of said hanger for transfer of load on said lower part to said upper part, said hanger including sealing means for sealing between said hanger and well head, said sealing means being disposed in between upper and lower elements of said upper part to be axially compressed by said load transferred thereto, said upper part shoulder being on said lower element, and means on said lower part of said hanger to engage a pipe to transfer weight to the lower part of the hanger, said sealing means shortening axially by a definite predetermined distance depending on the said axial distances between the said seats and between the said shoulders when pipe load is transmitted thereto to seat said lower part shoulder on the said lower seat, whereby the said axial compression of said sealing means does not exceed said predetermined distance, and lock screw means extending through said well head from the exterior thereof and engaging said upper element of said upper part of said hanger for loading said sealing means.

2. Pipe suspension and seal apparatus comprising a well head having an upper seat for supporting a packing means support means and a lower seat for supporting a pipe support means, a pipe support means comprising a hanger having an outer shoulder seatable on said lower seat and an inner slip engaging surface and having a plurality of upper extensions slidably received through said packing means support means and terminating upwardly in means common to all said upper extensions for compressing said packing means downwardly, a packing means support means disposed on said upper seat for supporting a packing means from beneath, an elastomeric packing means supported by said packing means support means and disposed between said packing means support means and said packing means compressing means and receiving said upper extensions slidably therethrough, a plurality of slips disposed between said hanger and a pipe disposed through said hanger for supporting said pipe from said hanger and thereby placing the load of said pipe on said hanger, said hanger shoulder being held above said lower seat when said pipe load is not on said hanger by said packing means acting between said packing means support means and said packing means compressing means, said hanger shoulder being seated upon said lower seat when said pipe load is on said hanger thereby acting through said extensions to pull said compressing means downwardly toward said packing means support means to compress and expand said packing means to form a seal between said well head and the said pipe creating said pipe load on said hanger, whereby said hanger is supported by said upper seat when there is no pipe load on said hanger and whereby said hanger is supported and said pipe load is supported primarily by said lower seat and secondarily by said upper seat when there is a pipe load on said hanger, and whereby said compression of said packing means is limited by engagement of said hanger shoulder on said lower seat when said pipe load is imposed on said hanger.

3. A pipe hanger apparatus, for insertion into a well head having a pair of spaced inwardly projecting shoulders, comprising an annular hanger bowl having a downwardly converging tapered inside surface, a plurality of slips inside said bowl in engagement with said inside surface, a support ring above said bowl, a seal ring of elastomeric material above said support ring, a compression ring above said seal ring, means connected to said bowl extending upwardly through said support ring and seal ring to said compression ring, stop means on said upwardly extending means limiting upward movement of said compression ring relative to said upwardly extending means without preventing downward movement of said compression ring relative thereto, said support ring having a larger outer diameter than said bowl, the outer periphery of the downwardly facing surface of said support ring where it extends beyond said bowl providing a downwardly facing shoulder on said apparatus, said bowl having an outer surface including a lower downwardly converging tapered portion, an untapered portion above said tapered portion, another untapered portion above the first said untapered portion and of larger diameter than the first said untapered portion, and a second downwardly facing support surface inclined at an angle of approximately 45° with respect to a horizontal plane defining an outer annular peripheral shoulder between said untapered portions and aligned approximately with the horizontal medial plane of said slips said downwardly facing shoulder and said second support surface normally being spaced apart through a distance less than the distance between said well head shoulders.

4. Pipe suspension and seal apparatus comprising suspension means for supporting a pipe, said suspension means including inner and outer pipe support means and annular bowl means disposed therebetween, said outer pipe support means comprising a well head within which said annular bowl means is disposed, said inner pipe support means comprising a plurality of slips disposed within said annular bowl means, said apparatus further comprising annular sealing means above said annular bowl means for sealing between said well head and said inner pipe, said annular sealing means including a base ring, a packing ring thereabove, and a compression ring on top of the packing ring, said suspension means providing an initial seat area for supporting said base ring above said annular bowl means, means mounting said annular bowl means in said well head of the outer pipe support means for relative axial movement therebetween and mounting said slips of the inner pipe support means in said bowl means for relative axial movement therebetween, the mounting means between one of said pipe support means and said annular bowl means including wedge means for causing radial inward motion of said slips toward said pipe upon imposition of load of said pipe on said suspension means, said wedge means including a conically tapered portion of said annular bowl means and a tapered portion of said one of said pipe support means, the mounting means between the other of said pipe support means and said annular bowl means including stop means for limiting relative axial motion between said other of said pipe support means and said annular bowl means, one of the last two said means having shoulder means thereon and the other providing a final seat area for supporting said shoulder means, releasable and reengageable connecting means extending from said shouldered means through said base ring and said packing ring to said compression ring for connecting said shouldered means to said compression ring, said shoulder means being held above said final seat area when said pipe load is not on said slips by said packing ring acting between said base ring and said compression ring, said shoulder means being seated upon said final seat area when said pipe load is on said slips thereby acting through said connecting means to pull said compression ring downwardly toward said annular bowl means to compress and expand said packing ring to form a seal between said well head and said pipe creating said pipe load on said slips, whereby the hanger comprising said annular sealing means and said annular bowl means and said slips is supported and said pipe load is supported partly by said initial seat area and partly by said final seat area when there is pipe load on said hanger and whereby said compression of said packing ring is limited by engagement of said shoulder means on said final seat area when said pipe load is imposed on said hanger and whereby said packing ring can be replaced without removing the pipe load from said slips and said annular bowl means.

References Cited in the file of this patent
UNITED STATES PATENTS

| | | |
|---|---|---|
| 1,857,101 | Nixon | May 3, 1932 |
| 2,610,689 | Eckel | Sept. 16, 1952 |
| 2,617,485 | Thatch | Nov. 11, 1952 |
| 2,683,045 | Brooks | July 6, 1954 |
| 2,683,046 | Allen | July 6, 1954 |
| 2,683,047 | Allen | July 6, 1954 |
| 2,689,139 | Jones et al. | Sept. 14, 1954 |